Figure 1:
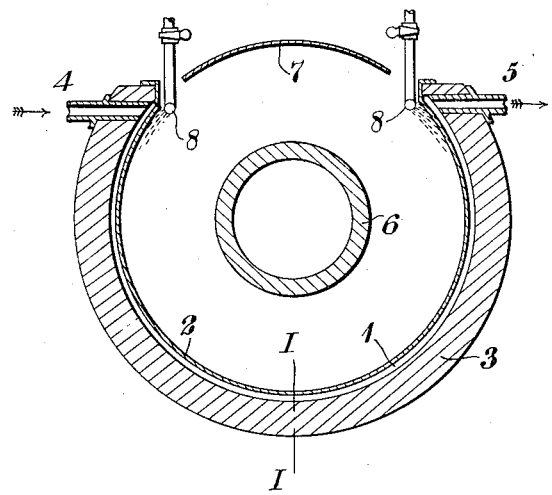

V. HENRI, A. HELBRONNER & M. VON RECKLINGHAUSEN.
APPARATUS FOR TREATING LIQUIDS WITH ULTRA-VIOLET RAYS.
APPLICATION FILED MAR. 12, 1913.

1,140,818. Patented May 25, 1915.

WITNESSES:
Wm Bohleber
William P Johnson.

INVENTORS:
Victor Henri,
André Helbronner &
Max von Recklinghausen
By
Kerr Page Cooper & Hayward

UNITED STATES PATENT OFFICE.

VICTOR HENRI, OF PARIS, AND ANDRÉ HELBRONNER AND MAX von RECKLINGHAUSEN, OF SURESNES, FRANCE, ASSIGNORS, BY MESNE ASSIGNMENTS, TO THE R. U. V. COMPANY, INC., A CORPORATION OF NEW YORK.

APPARATUS FOR TREATING LIQUIDS WITH ULTRA-VIOLET RAYS.

1,140,818. Specification of Letters Patent. Patented May 25, 1915.

Original application filed February 13, 1911, Serial No. 608,473. Divided and this application filed March 12, 1913. Serial No. 753,667.

*To all whom it may concern:*

Be it known that we, VICTOR HENRI, a citizen of the French Republic, residing at Paris, France, ANDRÉ HELBRONNER, a citizen of the French Republic, residing at Suresnes, France, and MAX VON RECKLINGHAUSEN, a subject of the German Emperor, residing at Suresnes, France, have invented a new and useful Improvement in Apparatus for Treating Liquids with Ultra-Violet Rays, of which the following is a specification, this application being a division of application Serial No. 608,473, filed February 13, 1911.

This invention relates to the treatment of liquids by means of ultra violet rays especially liquids that are somewhat opaque to the rays, and has for its object the construction of apparatus suitable for the purpose.

It has been found that ultra violet rays are capable of a number of commercial applications, for instance, their action may be usefully employed for maturing or aging wines, spirits and other potable liquids, for sterilizing milk and other liquids, for bleaching oils and for promoting various chemical re-actions.

In sterilizing water and other liquids which are not opaque to the ultra violet rays, the liquid may be submitted to the action of the rays in open troughs of considerable depth. In the case, however, of liquids such as milk, or liquids which are deeply colored, and liquids containing substances in suspension, it is necessary to conduct the operation while the liquid is in the form of a thin film, on account of its opacity to the rays. In many cases, as for instance in the aging of wine, it is undesirable to have the liquid exposed to the atmosphere, because the alcohol would evaporate and the carbonic acid would escape. It is necessary therefore to distribute the liquid in a thin film not open to the atmosphere but in a closed container.

In accordance with the present invention the liquid to be treated with the ultra violet rays is passed through a shallow channel preferably of circular cross-section which is provided with a top side of mica, quartz, uviol glass, this being a special kind of glass manufactured by Schott & Genossen of Jena, which is permeable by ultra-violet rays, or other material which is translucent to ultra-violet rays. The source of the ultra-violet rays, for instance a mercury vapor electric lamp provided with a quartz container, is supported substantially in the center of the cylindrical container so that the rays emitted by the lamp are capable of penetrating on all sides through the window, which is transparent to the rays. The liquid to be treated is passed through the channel while the lamp is operated, and is collected at the outlet in the desired condition either sterilized, bleached or otherwise treated, in accordance with the particular purpose in view.

Figure 2:
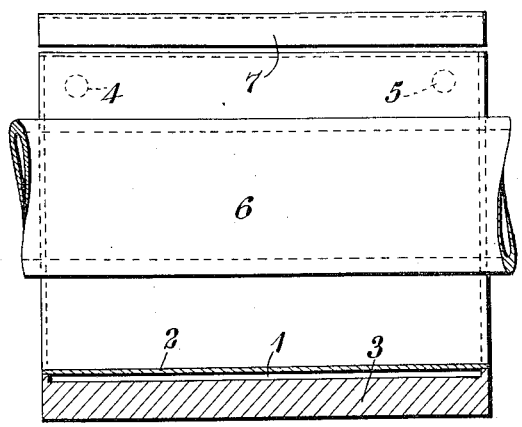

In the accompanying drawings a form of construction of the apparatus in accordance with the present invention is shown by way of example; Figure 1 being a vertical section of the apparatus, while Fig. 2 is a section on the line I—I of Fig. 1.

A shallow vessel 1 of substantially cylindrical shape and of suitable material such as metal, glass or porcelain is provided with a top side 2 of mica, quartz, uviol glass or the like, thus forming an annular tube having an internal window which is transparent to ultra-violet rays. This tube is supported on a frame 3 of wood for instance and the liquid is permitted to enter at 4 and leave the apparatus at the outlet 5. The source of ultra-violet rays, for instance a mercury vapor lamp 6 having a quartz container, is suitably located so that the ultra-violet rays emitted radially from the lamp pass through the quartz or mica window and act upon the liquid. A reflector 7 may be provided as shown in order to prevent the ultra-violet rays from passing away to the atmosphere without being utilized. In this form of apparatus the liquid treated is not exposed to the air and therefore in the case of wine, for instance, there is little evaporation of the alcohol, carbonic acid or other volatile compounds which the wine contains.

If desired the liquid may be kept cool while passing through the apparatus during exposure to the lamp by the provision for example of a water jacket on the side of the circular channel remote from the lamp, or a water spray arrangement 8 may be provided as shown.

One of the features of this apparatus is that the window permeable to ultra-violet rays may be located very near to the back of the channel so that the liquid can be exposed to the rays in the form of a very thin film. The position of the window with reference to the back part of the channel determines the thickness of the film.

It will be understood that the apparatus herein described is illustrative only and modifications may be made in the construction without departing from the spirit and scope of the invention.

We claim as our invention:—

1. An apparatus for treating liquids by ultra-violet rays, comprising, in combination, a shallow channel in substantially circular form with closely approximated ends provided with inlet and outlet ports, so that the liquids in passing from one to the other must flow circularly and through the channel in a thin film, an inner retaining wall for said channel, composed of material permeable to ultra-violet rays and a source of such rays located at the axial center of said channel.

2. In apparatus for treating liquids by ultra-violet rays, the combination with a ultra-violet rays, the combination with a shallow circular channel through which liquid must flow circularly in a thin film, of an inner retaining wall for said channel composed of material permeable to ultra-violet rays, a source of ultra-violet rays at the center of said retaining wall, and a means for discharging a cooling fluid over said wall.

In testimony whereof we have hereunto subscribed our names this 12th day of February 1913.

VICTOR HENRI.
ANDRÉ HELBRONNER.
MAX von RECKLINGHAUSEN.

Witnesses:
  JACK H. BAKER,
  LUCIEN MEMMINGER.